United States Patent [19]

Sugimoto et al.

[11] Patent Number: 4,509,374
[45] Date of Patent: Apr. 9, 1985

[54] ELECTRIC DYNAMOMETER

[75] Inventors: Akinori Sugimoto, Hyogo; Hiroshi Sugimoto, Osaka, both of Japan

[73] Assignee: Mitsubishi Denki Kabushiki Kaisha, Tokyo, Japan

[21] Appl. No.: 474,644

[22] PCT Filed: Jun. 28, 1982

[86] PCT No.: PCT/JP82/00247
§ 371 Date: Feb. 25, 1983
§ 102(e) Date: Feb. 25, 1983

[87] PCT Pub. No.: WO83/00224
PCT Pub. Date: Jan. 20, 1983

[30] Foreign Application Priority Data

Jun. 30, 1981 [JP] Japan .................................. 56-102795

[51] Int. Cl.³ .............................................. G01L 3/22
[52] U.S. Cl. ................................................... 73/862.17
[58] Field of Search ............ 73/862.11, 862.17, 862.18

[56] References Cited

U.S. PATENT DOCUMENTS 2,389,572 11/1945 Winther ........................... 73/862.17

FOREIGN PATENT DOCUMENTS 1573 1/1980 Japan ................................ 73/862.17
0582411 11/1946 United Kingdom ............. 73/862.09

Primary Examiner—Charles A. Ruehl
Attorney, Agent, or Firm—Wenderoth, Lind & Ponack

[57] ABSTRACT

An electric dynamometer which includes a rotor mounted for rotation on a shaft and a stator surrounding the rotor, the stator including a yoke surrounding the rotor in radially spaced relation therewith, and a loss drum disposed between the yoke and the rotor so as to be rotatable 360° about the rotor. An electric motor is coupled through its rotor to the loss drum so as to rotate the loss drum therewith. A stator of the electric motor is fixed to the yoke, and the yoke and stator of the motor are supported for rotation about the respective rotors. A torque detector is fixed to the stator of the motor so as to measure the combined torque exerted on the yoke and the stator of the motor about the rotors.

1 Claim, 10 Drawing Figures

ELECTRIC DYNAMOMETER

BACKGROUND OF THE INVENTION

TECHNICAL FIELD

This invention relates to an eddy current type electric dynamometer for measuring a torque of a motor vehicle or the like.

BACKGROUND ART

FIG. 1(a) and FIG. 2(a) are views illustrating respective constructions of conventional eddy current type electric dynamometers, and FIG. 1(b) and FIG. 2(b) are sectional views of the respective constructions illustrated in FIG. 1(a) and FIG. 2(a). The construction illustrated in FIG. 1(a) and FIG. 1(b) is the so-called drum type eddy current dynamometer while the construction illustrated in FIG. 2(a) and FIG. 2(b) is the so-called disc type eddy current dynamometer.

In FIG. 1(a), FIG. 1(b), FIG. 2(a), and FIG. 2(b), reference numeral 1 designates a shaft, and a rotor 2 (an inductor) is mounted to the shaft 1 with the rotor 2 and the shaft arranged to be integrally rotated. In the case of FIGS. 1(a) and (b), a loss drum 3 is mounted to a yoke 4 to face the rotor 2. An exciting coil 5 is wound inside the yoke 4, and the loss drum 3 and the rotor 2 are arranged to have a gap 6 therebetween.

In the construction of FIGS. 2(a) and 2(b), said rotor 2 extends into a notch on the yoke 4 and this yoke 4 and the notch are arranged to form a gap 6 therebetween. An exciting coil 5 is wound inside the yoke 4.

A path for a magnetic flux is designated by the phantom line arrow in FIG. 1(a) and FIG. 2(a).

The operation of a conventional electric dynamometer of the drum type illustrated in FIGS. 1(a) and 1(b) is quite the same in principle as that of the disc type illustrated in FIGS. 2(a) and 2(b), and will be described with references to FIGS. 1(a) and 1(b). When a constant current flows through the exciting coil 5, the direction of the magnetic flux caused thereby will depend on the direction of the current. Upon rotating the shaft 1 with respect to the outer yoke 4, the rotor 2 is also rotated. Referring to one point on the surface of the loss drum 3 or the yoke 4, the rotation of the rotor 2 is accompanied by a change in radial width of the gap 6 with time. This is because the rotor 2 is provided with alternating concave and convex portions as shown in FIG. 1(b). Accordingly, a change in magnitude of the magnetic flux results. In short, the high and low density portions of the magnetix flux are moved along with the rotation of the rotor 2.

If the density of the magnetic flux penetrating through a conductor is temporally changed then the so-called eddy current is generated there. As a result, a force acts across the rotor 2 and the yoke 4 in a direction to stop the rotation while electrical energy is converted to thermal energy by means of the electric resistance of the loss drum 3 during the conduction of eddy current through the loss drum.

According to the principles of the operation as described above, the eddy current dynamometer can absorb input rotational energy to the shaft 1 in the form of thermal energy.

It is generally constructed so that a torque applied to the yoke 4 can be read by a torque meter (not shown). The yoke 4 in the eddy current dynamometer is produced so as to be slightly rotatable for the purpose of measuring the torque but the same is impossible to continue to be rotated about the shaft 1. The yoke 4 is, on the whole, in a substantially stationary state with respect to the ground.

Further it is described for caution's sake that the function of the loss drum 3 is not essential and is to improve the efficiency of the energy conversion.

The loss drum is normally made from a material identical in reluctance to and higher in electric resistance than the rotor 2 or the yoke 4 so as to cause the greater part of the generation of heat therein.

The eddy current dynamometer has the advantage that the structure thereof as described above is cheap and small-sized as compared to other electric dynamometers, for example, a DC generator type dynamometer or an exchange generator type dynamometer.

FIG. 3 illustrates one example of the characteristics of the eddy current type dynamometers illustrated in FIG. 1(a) and FIG. 2(a) and shows a torque caused with the current through the exciting coil 5 kept constant and with the rotational speed N varied. Where the rotational speed is low, the magnetic flux crosses a conductor at a low speed. Thus, the eddy current is also small and the torque caused is small.

Since conventional eddy current dynamometers have been constructed as described above, there has been the disadvantage that, when the speed of rotation is low, a sufficient absorption torque is not caused. Also, since absorbed energy is converted to heat, they have the disadvantage that it is difficult to utilize this energy otherwise and herewith it has been natural that they do not posses the torque in a sense of driving others with their own outputs or the so-called driving force.

BRIEF SUMMARY

Since the present invention has been constructed so that a yoke which is a stator of an eddy current dynamometer can be driven by another electric motor and thus the same has the effects that, by properly selecting the speed of the electric motor, a large absorption torque can be obtained even with low speed rotations while a driving force can be obtained and the recovery of energy is possible.

DETAILED DESCRIPTION OF THE PREFERRED EMBODIMENTS

Figure 1A:
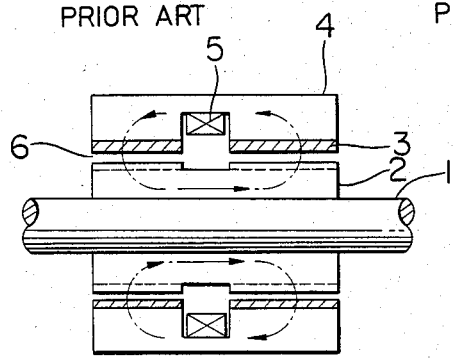
FIG. 1(a) is a sectional view illustrating a construction of a conventional drum type eddy current dynamometer.
Figure 1B:
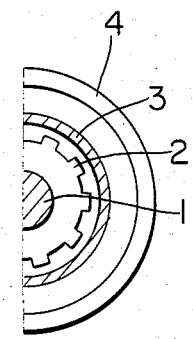
FIG. 1(b) is a sectional view of one half of the dynamometer of FIG. 1(a)
Figure 2A:
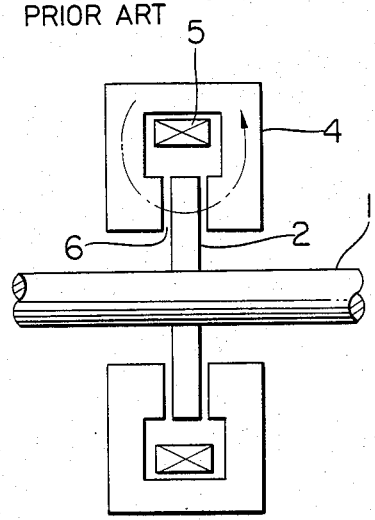
FIG. 2(a) is a sectional view illustrating a construction of a conventional disc type eddy current dynamometer.
Figure 2B:
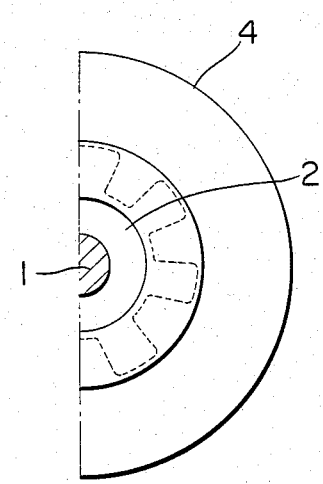
FIG. 2(b) is a sectional view of one half of the dynamometer of FIG. 2(a)
Figure 4:
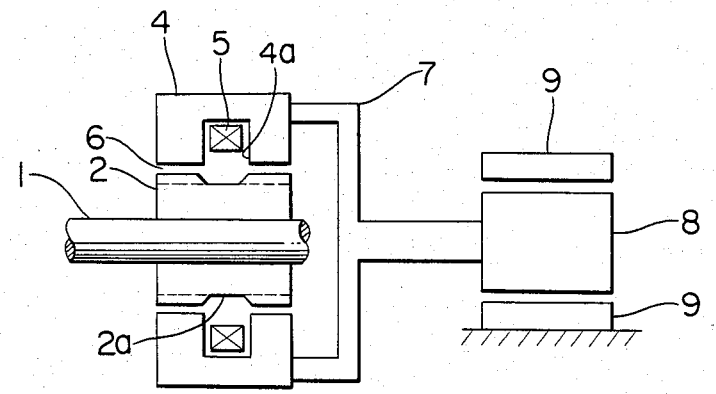
FIG. 4 is a sectional view illustrating a construction of one embodiment of the electric dynamometer of the present invention.

FIG. 4 is a sectional view illustrating a construction of one embodiment of the present invention. In this FIG. 4 the components identical to FIG. 1(a) will be identified by annexing the identical reference numerals to them.

In FIG. 4, a rotor 2 is mounted to an outer peripheral surface of a shaft 1, a recess 2a is formed in the central portion of the outer peripheral surface of this rotor 2, and a yoke 4 which is the main body of a stator is disposed to oppose the rotor 2.

This yoke 4 has a section in the form of an upside down U so as to have a recess 4a in a portion facing the recess 2a in the rotor 2.

This recess in the yoke 4 has an exciting coil 5 disposed therein and the yoke 4 and the rotor 2 are arranged to have a gap 6 therebetween. The yoke 4 is connected to a rotor 8 of an electric motor through a shaft 7. Further reference numeral 9 designates the stator of the electric motor.

The yoke 4 is of a structure in which the same continues to be freely rotated coaxially about the rotor 2 along with the exciting coil 5, and an eddy current dynamometer which includes the shaft 1, the rotor 2, the yoke 4 and the exciting coil 5 is disposed coaxially with the electric motor (which includes the rotor 8 and the stator 9). Furthermore, regarding a loss drum, the illustration thereof is omitted because it is not important to the essential meaning of the present invention.

Figure 3:
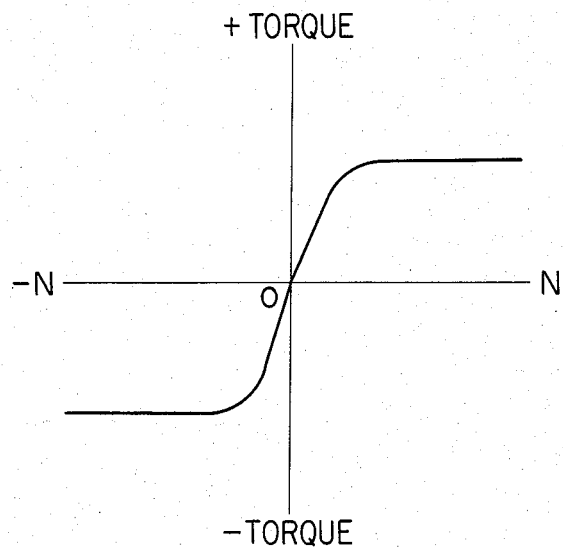
FIG. 3 is a diagram of the torque characteristic of the conventional eddy current dynamometer.

The operation of the electric dynamometer of the present invention constructed as described above will now be described. With the rotor 8 of the electric motor fixed so as not to be rotated, the torque characteristic of the eddy current dynamometer is not substantially different from those of the prior art whose torque characteristics are shown in FIG. 3.

Figure 5A:
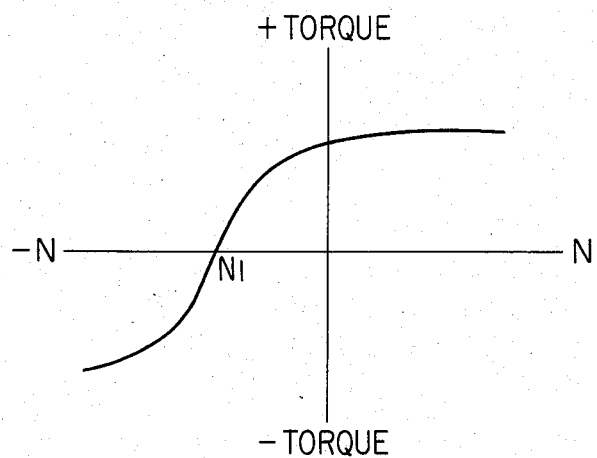
FIG. 5(a) is a diagram of the torque characteristic of the electric dynamometer of FIG. 4 with an electric motor thereof opposite in direction of rotation to that of the eddy current dynamometer.
Figure 5B:
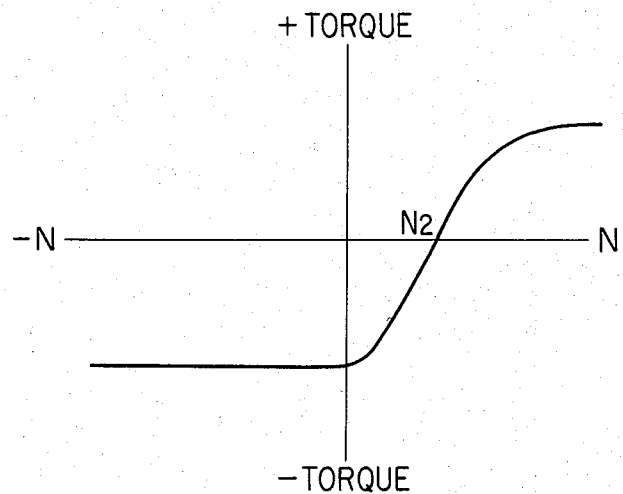
FIG. 5(b) is a diagram of the torque characteristic of the electric dynamometer of FIG. 4 with the electric motor thereof identical in direction of rotation to that of the eddy current dynamometer.

However when the rotor 8 of the electric motor is rotated at a constant speed $N_1$ in a direction reversed from the direction of rotation of the eddy current dynamometer, the torque characteristic thereof is substantially as shown in FIG. 5(a), and also, when the electric motor 8 is rotated at a constant speed $N_2$ in the same direction, the characteristic thereof is substantially as shown in FIG. 5(b).

Also, in the case of FIG. 5(b), a rotational speed of the input shaft 1 in the eddy current dynamometer less than the rotational speed $N_2$ of the yoke 4 results in the eddy current dynamometer providing a torque.

Furthermore, where the rotational speed of the input shaft 1 in the eddy current dynamometer is higher than the rotational speed $N_2$ of the yoke 4, it receives a force in a direction in which an acceleration is further effected beyond the self-rotational speed $N_2$ of the rotor 8 of the electric motor. Thus, it is operated as an electric generator.

Assuming in this case that N designates an input rotational speed to the eddy current dynamometer, T an absorption torque by the eddy current dynamometer and $N_2$ designates the rotational speed of the yoke 4, $$NT = (N - N_2)T + N_2T \quad (1)$$

holds where NT designates the total power absorption, $(N-N_2)T$ the amount of power converted to heat by the eddy current dynamometer and $N_2T$ designates the amount of electric power generated by the electric motor.

Accordingly, if a magnitude of $N_2$ is selected to be sufficiently high, in a range over which a necessary torque is provided, then the greater part of the input energy can be obtained as electric power from the electric motor. Also if the input rotational speed $N_2$ is rendered high then a driving force can be also provided.

Figure 6:
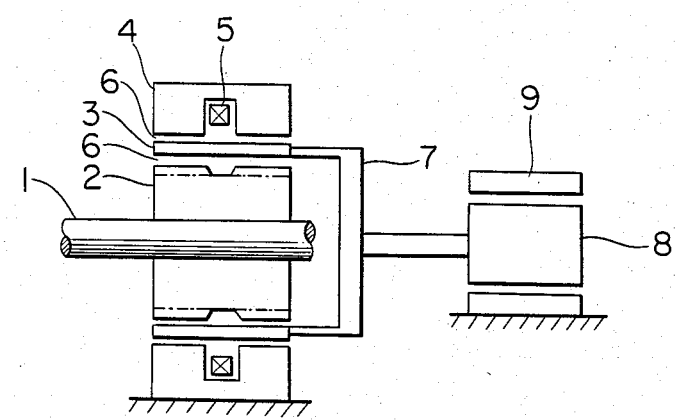
FIG. 6 and FIG. 7 are sectional views respectively illustrating constructions of other embodiments of the present invention.

FIG. 6 is a sectional view illustrating a second embodiment of the electric dynamometer of the present invention. The yoke 4 is made to be fixed to the ground. A loss drum 3 is disposed within the gap 6 to be rotated coaxially with the shaft 1 and connected to the rotor 8 of the electric motor through the shaft 7.

In this embodiment it is not required to rotate the yoke 4 or the exciting coil 5 so that there is the advantage that it is more easily manufactured.

Figure 7:
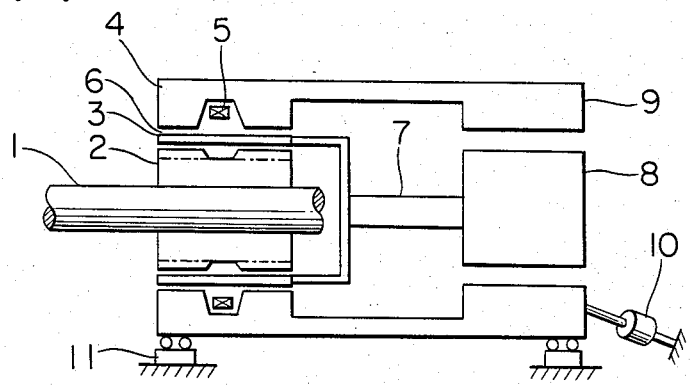

FIG. 7 is a sectional view illustrating a construction of a third embodiment of the present invention. In this embodiment the yoke 4 and the stator 9 of the electric motor are connected to each other while the rotor 8 is connected to the loss drum 3 through the shaft 7. These elements are arranged to be supported by means of a rotary bearing 11 and to be fixed to the ground by means of a torque detector 10.

By doing so, a torque can be directly known by the torque detector 10 alone. Other portions of the embodiment are quite the same as that illustrated in FIG. 4.

In addition, the electric motor may be of any type. Also, in addition to use with motor vehicles, the motor and dynamometer may be used in other applications.

We claim:

1. An electric dynamometer, comprising:
   (a) a rotatable shaft;
   (b) a first rotor mounted for conjoint rotation with said shaft;
   (c) a first stator surrounding said first rotor, said first stator including a dynamometer yoke surrounding said first rotor in radially spaced relation therewith, and a loss drum between said dynamometer yoke and said first rotor, rotatable through 360° about said first rotor;
   (d) an electric rotor including a second rotor and a second stator surrounding said second rotor, said second rotor being coupled to said loss drum so as to rotate said loss drum therewith about said first rotor, said second stator being fixed to said dynamometer yoke so as to define in combination with said dynamometer yoke a combined yoke surrounding said first and second rotors;
   (e) means for supporting said combined yoke for rotation about said first and second rotors; and
   (f) means, including a torque detector connected to said combined yoke, for measuring the combined torque exerted on said dynamometer yoke and said second stator about said first and second rotors.

* * * * *